(12) United States Patent
Silvert

(10) Patent No.: US 11,429,400 B2
(45) Date of Patent: Aug. 30, 2022

(54) USER INTERFACE METADATA FROM AN APPLICATION PROGRAM INTERFACE

(71) Applicant: Red Hat, Inc., Raleigh, NC (US)

(72) Inventor: Stan David Silvert, McDonough, GA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/789,794

(22) Filed: Oct. 20, 2017

(65) Prior Publication Data

US 2019/0121649 A1 Apr. 25, 2019

(51) Int. Cl.
*G06F 9/451* (2018.01)
*G06F 9/54* (2006.01)
*G06F 9/445* (2018.01)

(52) U.S. Cl.
CPC .......... *G06F 9/451* (2018.02); *G06F 9/44505* (2013.01); *G06F 9/452* (2018.02); *G06F 9/547* (2013.01)

(58) Field of Classification Search
CPC ....... G06F 9/451; G06F 9/44505; G06F 9/547
See application file for complete search history.

(56) References Cited

U.S. PATENT DOCUMENTS

| | | | | |
|---|---|---|---|---|
| 9,015,730 | B1 * | 4/2015 | Allen | G06F 9/541 |
| | | | | 719/313 |
| 9,027,039 | B2 * | 5/2015 | Michels | G06F 15/16 |
| | | | | 719/310 |
| 9,521,040 | B2 | 12/2016 | Vergara et al. | |
| 9,930,103 | B2 * | 3/2018 | Thompson | H04L 67/2804 |
| 9,983,860 | B1 * | 5/2018 | Koty | H04L 67/10 |
| 10,222,926 | B2 * | 3/2019 | Pandian | G06F 3/0481 |
| 10,296,411 | B1 * | 5/2019 | Diggins | G06F 11/0706 |
| 2007/0220035 | A1 | 9/2007 | Misovski | |
| 2010/0250816 | A1 * | 9/2010 | Collopy | G06F 1/1616 |
| | | | | 710/303 |
| 2012/0173962 | A1 * | 7/2012 | Oh | G06F 16/9577 |
| | | | | 715/234 |

(Continued)

OTHER PUBLICATIONS

Saputra et al., "A Metadata Approach for Building Web Application User Interface," [retrieved from http://www.sciencedirect.com/science/article/pii/S2212017313004283/], Jan. 29, 2014, 4 pages.

(Continued)

*Primary Examiner* — S. Sough
*Assistant Examiner* — Phuong N Hoang
(74) *Attorney, Agent, or Firm* — Womble Bond Dickinson (US) LLP

(57) ABSTRACT

A method includes receiving, from a client device, a request for graphical user metadata (GUM) associated with an application program interface (API), wherein the request is directed to a well-known GUM endpoint of the API. The method further includes in response to determining, by a processing device, that the well-known GUM endpoint corresponds to the GUM, generating a GUM response corresponding to the GUM and providing a GUM response corresponding to the GUM to the client device. The method further includes in response to determining, by the processing device, that the well-known endpoint does not correspond to the GUM, providing an error message to the client device.

20 Claims, 6 Drawing Sheets

(56) References Cited

U.S. PATENT DOCUMENTS

| | | | | |
|---|---|---|---|---|
| 2012/0233668 A1* | 9/2012 | Leafe | ................... | G06F 9/44526 726/4 |
| 2013/0290858 A1* | 10/2013 | Beveridge | ............. | G06F 16/957 715/740 |
| 2014/0096014 A1 | 4/2014 | Johnson et al. | | |
| 2014/0181186 A1* | 6/2014 | Stevens | ................... | H04L 63/08 709/203 |
| 2014/0298361 A1 | 10/2014 | Cussonneau et al. | | |
| 2015/0142833 A1* | 5/2015 | McClelland | ............. | G09B 5/00 707/755 |
| 2015/0154617 A1 | 6/2015 | DiPietro et al. | | |
| 2015/0293673 A1* | 10/2015 | Peters | ................... | G06F 3/0481 715/763 |
| 2015/0331675 A1* | 11/2015 | De Magalhaes | .......... | G06F 8/35 717/104 |
| 2016/0055220 A1* | 2/2016 | Joshi | ................... | G06F 3/04842 707/722 |
| 2016/0077901 A1* | 3/2016 | Roth | ....................... | H04L 67/42 719/328 |
| 2016/0103750 A1* | 4/2016 | Cooper | ................... | G06F 9/542 719/328 |
| 2016/0301739 A1* | 10/2016 | Thompson | .............. | G06F 9/547 |
| 2016/0308900 A1* | 10/2016 | Sadika | .................. | G06F 21/552 |
| 2017/0192827 A1* | 7/2017 | Ghafourifar | ............. | G06F 9/543 |
| 2017/0337052 A1* | 11/2017 | Elkabany | .................. | G06F 8/71 |
| 2018/0176266 A1* | 6/2018 | Filart | .................... | H04L 65/605 |

OTHER PUBLICATIONS

Shahid et al., "WP Rest API: Creating, Updating, and Deleting Data," [retrieved from https://code.tutsplus.com/tutorials/wp-rest-api-creating-updating-and-deleting-data--cms-24883], Apr. 1, 2016, 16 pages.

salesforce.com "Retrieve Metadata for an Object," [retrieved from https://developer.salesforce.com/docs/atlas.en-us.api_rest.meta/api_rest/dome_sobject_basic_info.htm Aug. 30, 2017], 2 pages.

* cited by examiner

USER INTERFACE METADATA FROM AN APPLICATION PROGRAM INTERFACE

TECHNICAL FIELD

Aspects of the present disclosure relate to user interfaces, and more particularly, to user interfaces from an application program interface.

BACKGROUND

Applications which are used by users for various purposes may be implemented using various paradigms. For example, an application may be installed and/or executed on a computing device (e.g., a tablet computer, a smartphone, a laptop computer, a desktop computer, etc.) of a user. A web application (also referred to herein as a web app) may be an application that uses a client-server model where the user interface of the application is presented by a web browser of a client device and where the actions, operations, functions, methods, calculations, etc., of the web application are generally performed by a server computing device. Examples of a web application may include, but are not limited to a messaging application, a video application, a social networking application, a video sharing application, a photo sharing application, a chat application, a content (e.g., video, music, etc.) delivery application, or any combination of such applications. A web application may be a computationally large or data-intensive application, such as a forecasting application, a modeling application, a data analysis application, etc. Web applications may also be referred to as Software as a Service (SaaS) applications.

Users may interact with a web application, or any other application hosted by a remote server, via an application program interface (API), which may define functionality allowed by the remote server. APIs may be presented to a user using a web page that is rendered by a web browser of a client device, or via a standalone application. A web page may include markup language such as hypertext markup language (HTML). The web page may also include various resources or objects, such as scripts, images, video, text, style sheets, etc. The web application may be divided into multiple components, which may be referred to as web application components or micro applications. Each web application component may perform different functions, operations, actions, processes, methods, etc., for the web application and/or may provide different services, functionalities, and/or resources for the web application. In some implementations of web applications, each web application component may be accessed by a web browser using a different uniform resource locator (URL). In other implementations of web applications, a single web page may be loaded by the web browser and the webpage may be dynamically updated as the user interacts with the web application (also referred to as single-page web application). Various programming languages and/or runtime environments may be used to implement the components of a web application. For example, the components of the web application may be implemented using JAVA, JavaScript, Perl, Python, etc. Client devices, on which API UIs may be provided, may interact with the server computing device via the UI of the API.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
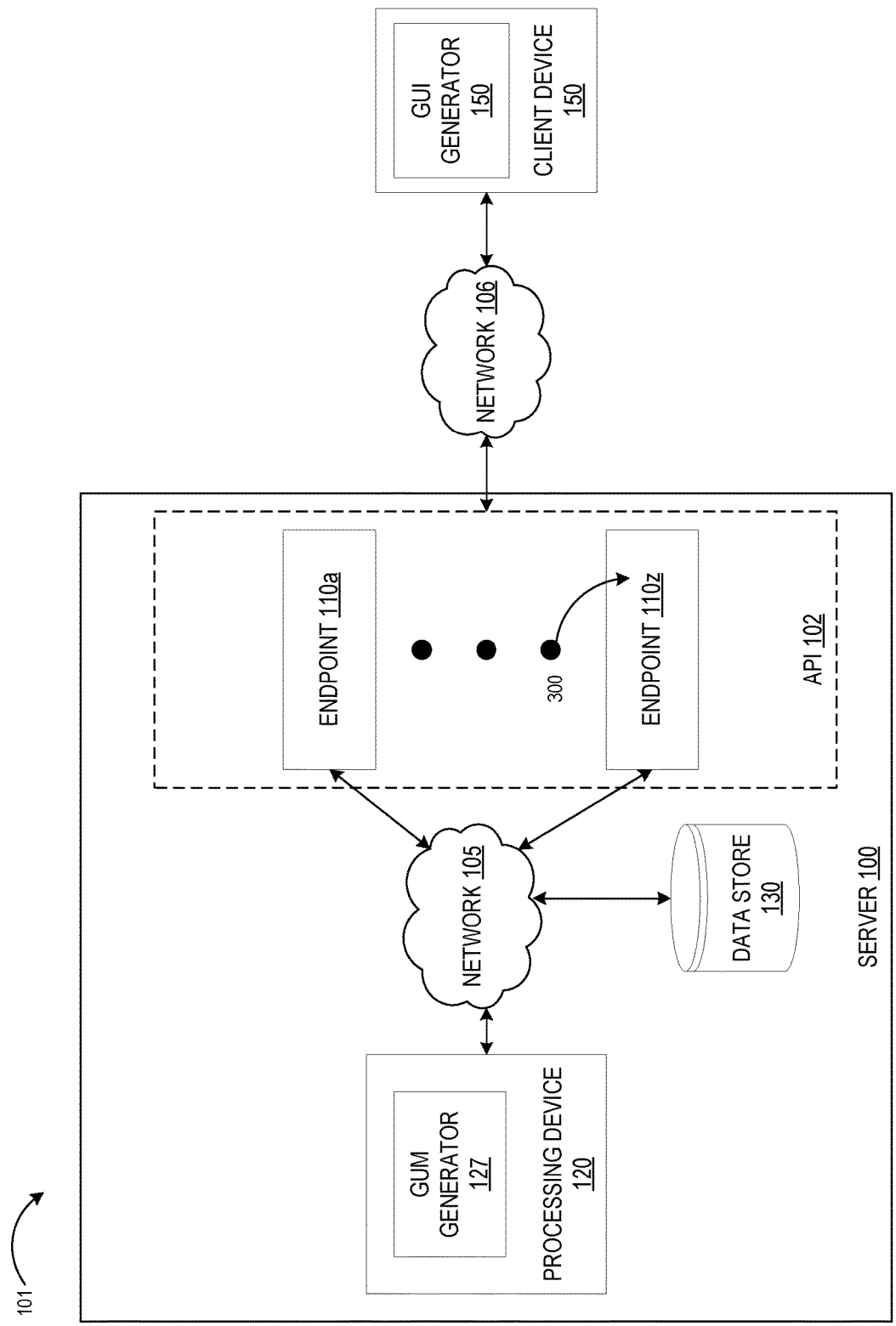
FIG. 1 is a block diagram that illustrates an example user interface metadata from an application program interface system, in accordance with some embodiments of the present disclosure.

A web application (also referred to herein as a web app) may be an application that uses a client-server model where the user interface of the application is presented by a web browser of a client device and where the actions, operations, functions, methods, calculations, etc., of the web application are generally performed by a server computing device. The web application may be divided into multiple components, which may be referred to as web application components or micro applications. Each web application component may perform different functions, operations, actions, processes, methods, etc., for a web application and/or may provide different services, functionalities, and/or resources for the web application.

In one embodiment, a representational state transfer (REST) application program interface (API) may provide operations to perform create, remove, update, and delete (CRUD) operations on a remote server (e.g., a server hosting a web application). A user interface that represents an API may be a convenient way to access the API. In one embodiment, the creation of a user interface (UI) that interacts with such an API may be time-consuming process that requires extensive knowledge of the data, its structure, types, accessors, mutators, endpoints, and validations rules for the API. A UI may require human-readable information about the data such as labels and help text. In addition, human-readable text may need to be localized to the language and culture of the specific user being served by the UI.

In one embodiment, one way to get this information is through manually-produced documentation, reading and deciphering server-side code, and/or conducting conversations with the original developer of the REST API. Such a solution may be time-consuming and inefficient.

The present disclosure addresses the above-noted and other deficiencies by providing a well-known endpoint that retrieves a description of the API in the form of Graphical User Metadata (GUM). This metadata may be used by a developer to generate a user interface for the entire REST API. In one embodiment, the GUM may be used as a reference for a developer to generate a manually-created UI, or it can be used to automatically generate a UI, or some combination of the two. In one embodiment, the systems and operations described herein provide for a client device to request GUM from a well-known GUM endpoint of an API. One such example of a well-known GUM endpoint may be http://mydomain.com/myrestapi/getgum. In this example, the endpoint may then provide a GUM response, including the requested GUM. In one embodiment, the GUM includes all of the information relevant to constructing a UI for CRUD operations on data managed by the REST endpoints at http://mydomain.com/myrestapi. The GUM may then be used to generate a UI associated with the API.

Advantageously, by providing a well-known GUM endpoint, by which a client device may request and receive GUM associated with a particular API, the efficiency and ease associated with the generation (either automatically or through some level of human interaction) of UIs associated with APIs may be greatly improved.

FIG. 1 is a block diagram that illustrates an example user interface metadata from an application program interface system 101, in accordance with some embodiments of the present disclosure. As discussed above, a web application may be an application that uses a client-server model where the user interface of the application is presented by a web browser of a client device of a user and where actions, operations, functions, methods, calculations, etc., of the web application are generally performed by a server computing device. The web application may be provided by a server 100. Server 100 may include various components, which may allow a web application to run on a server device or client device. Each component may perform different functions, operations, actions, processes, methods, etc., for a web application and/or may provide different services, functionalities, and/or resources for the web application. Server 100 may include an application program interface (API) 102 to provide access to an application of server 100. In one embodiment, API 102 may include any number of endpoints 110a-110z, which may allow a client device to access the various functions, operations, actions, processes, and methods provided by the API 102. In one embodiment, server 10

In one embodiment, the server 100 may host the web application. For example, different components of server 100 may be located on and/or may execute on different processing devices (e.g., processing device 120) of the server 100, as discussed in more detail below. In one embodiment, graphical user metadata 127 may be implemented on processing device 120 of server 100.

As illustrated in FIG. 1, server 100 includes an API 102, a computing processing device 120, a data store 130, and a network 105. The API 102, the processing device 120, and the data store 130 is coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 100. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The server 100 may comprise any suitable type of computing device or machine that has a programmable processor including, for example, server computers, desktop computers, laptop computers, tablet computers, smartphones, set-top boxes, etc. In some examples, the server 100 may comprise a single machine or may include multiple interconnected machines (e.g., multiple servers configured in a cluster). The server 100 may be implemented by a common entity/organization or may be implemented by different entities/organizations. For example, a server 100 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

As discussed herein, the server 100 may provide GUM to client devices (e.g., client device 150) to aid in the generation of graphical user interfaces (GUIs) associated with an API of the application running on the server 100. In one embodiment, server 100 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a wireless fidelity (WiFi) hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101.

Client device 150 may include a GUI generator 150, which may generate an application-specific GUI based on GUM generated by and received from server 100. In one embodiment, the GUI generator 150 allows a developer to create a GUI. In another embodiment, GUI generation 150 automatically generates the GUI based on the GUM. Further implementation details of the operations performed by system 101 are described with respect to FIGS. 2-5.

Figure 2:
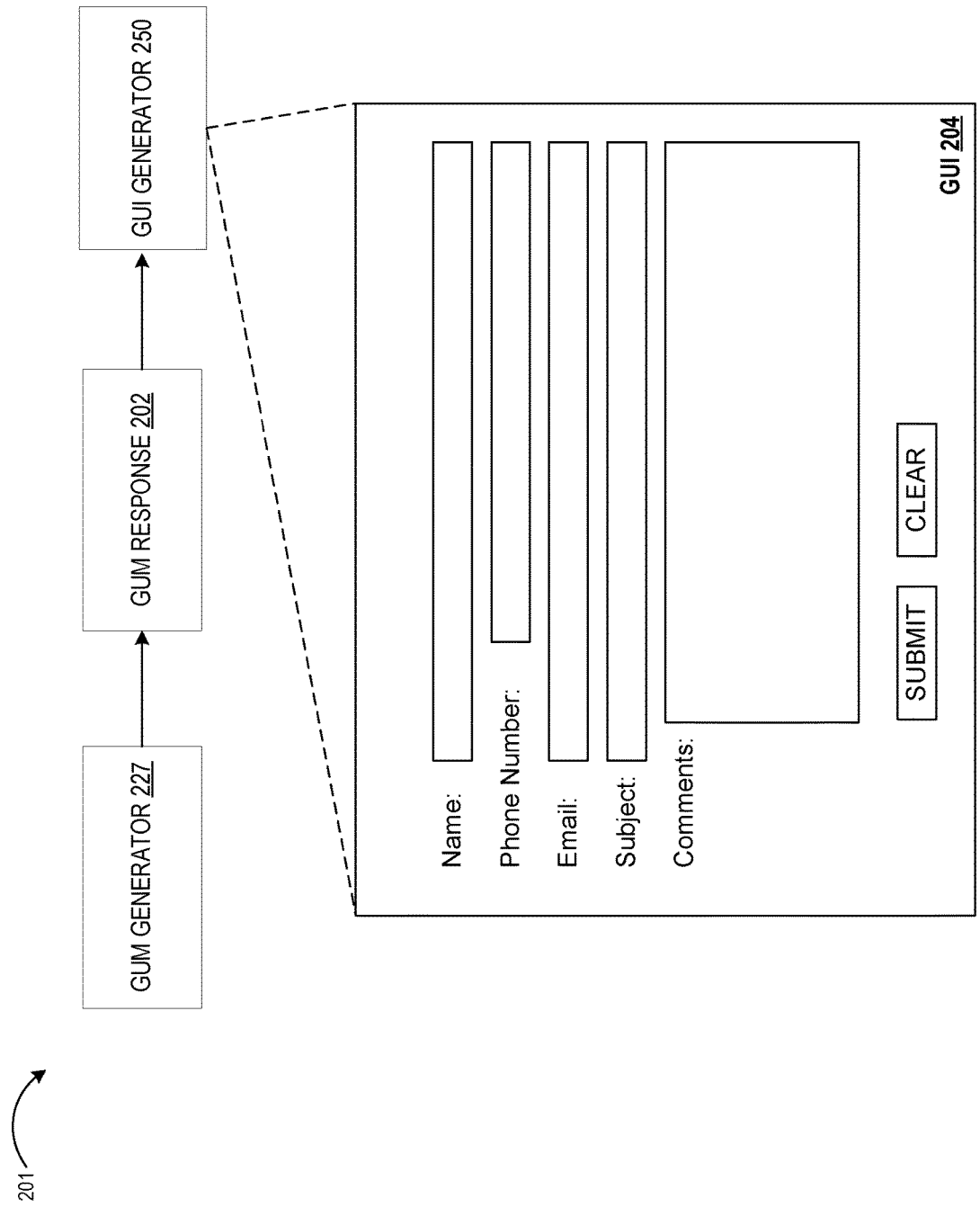
FIG. 2 is a block diagram that illustrates an example user interface metadata from an application program interface flow, in accordance with some embodiments of the present disclosure.

FIG. 2 is a block diagram that illustrates an example user interface metadata from an application program interface flow 201, in accordance with some embodiments of the present disclosure. In one embodiment, GUM generator 227 is the same as GUM generator 127 of FIG. 1. The operations and functionality of GUM generator 227 may be provided by a processing device of a server hosting an application (e.g., processing device 120 of server 100 of FIG. 1). In one embodiment, GUM generator may receive a request from a client device for GUM associated with a particular application. The client device may make request for the GUM to a well-known endpoint of an API associated with the application it would like to access. In one embodiment, the well-known endpoint may provide the sole functionality of providing GUM when requested. In another embodiment, the well-known endpoint may provide additional functionality in addition to providing the GUM.

As described herein, a well-known endpoint is an endpoint for which the endpoint address is known and consistent across a plurality of APIs. For example, a client device requesting access to the well-known endpoint may do so using a standard protocol, irrespective of the specific API. In one embodiment, an AP may either include a (or more than one) well-known GUM endpoint or it may not. In either case, a client device requesting GUM from an API associated with an application may do so with a request the to the well-known GUM endpoint. In the case where the endpoint exists, a GUM response (a message including the GUM requested) 202 may be returned to the client device. If no such endpoint exists, an error message may be returned to the client device indicating that no such GUM endpoint exists. At block 250, a client device may use the GUM response 202 to generate a GUI (e.g., GUI 204). The GUI may be generated by a developer utilizing the GUM response 202, or may be generated automatically (e.g., without human interaction) from the GUM response 202.

As shown, GUI 204 is one non limiting example of a GUI that may be generated by the GUI generator at block 250. In one embodiment, the GUI 204 may allow for efficient access of the underlying API for which the GUI was generated. Using the information contained in the GUM response, the various graphical and functional components of the GUI 204 may be generated, either by a developer or automatically.

Figure 3:
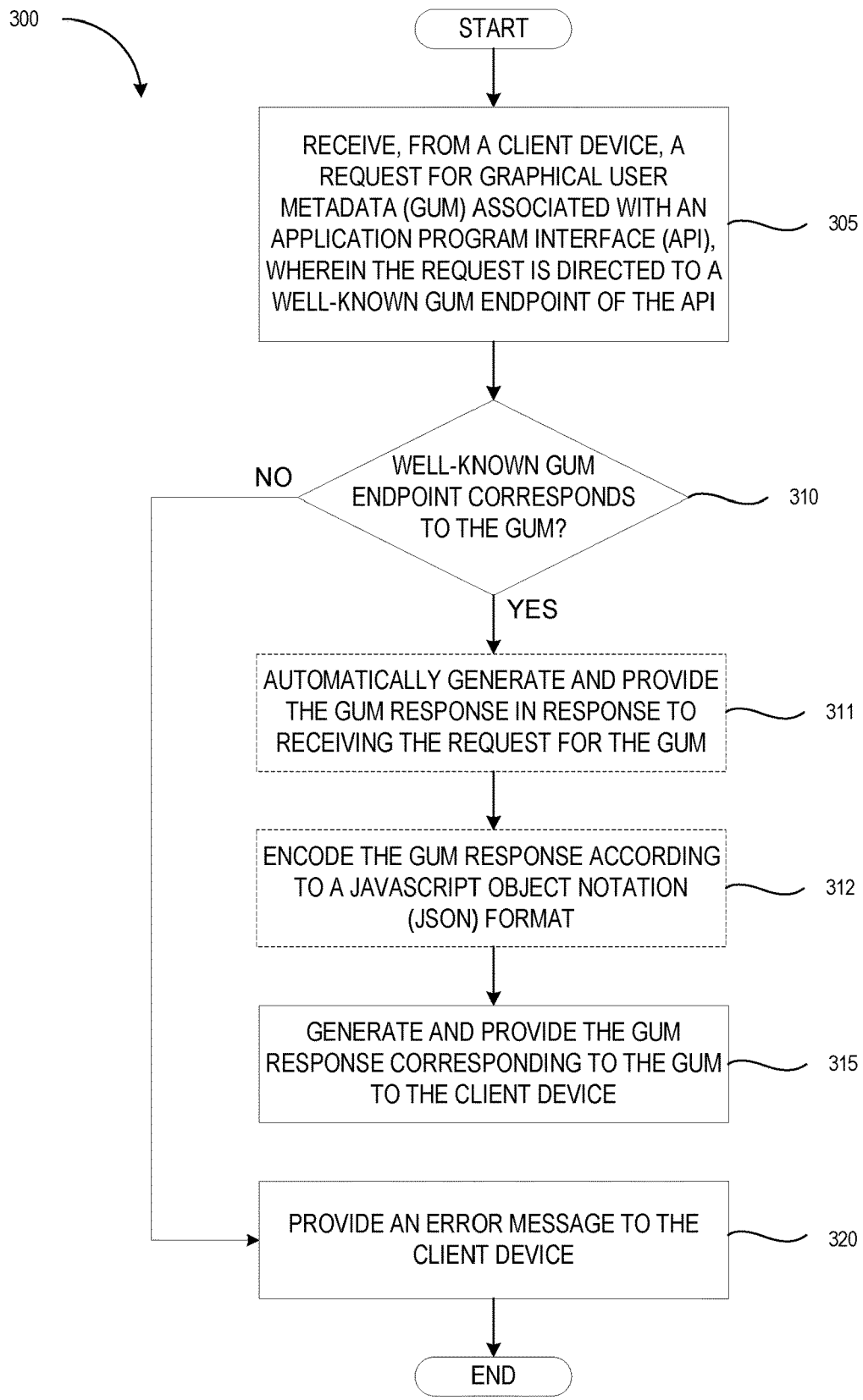
FIG. 3 is a flow diagram of a method of system-side user interface metadata from an application program interface, in accordance with some embodiments of the present disclosure.

FIG. 3 is a flow diagram 300 of a method of system-side user interface metadata from an application program interface, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 3, at block 305 processing logic receives, from a client device, a request for graphical user metadata (GUM) associated with an application program interface (API). In one embodiment, the API may be a REST API. In another embodiment, the API may be any type of API. In one embodiment, the request is directed to a well-known GUM endpoint of the API. In one embodiment, due to the nature of being well-known, the GUM endpoint may be known by the client device without the client device requesting specific knowledge of the endpoint from the API.

At block 310, processing logic may determine whether the well-known GUM endpoint corresponds to the GUM that was requested. For example, processing logic may determine if the well-known GUM endpoint exists and is capable of receiving and serving GUM requests. In one embodiment, processing logic may perform various operations based on the determination. At block 315, processing logic may, in response to determining, by a processing device, that the well-known GUM endpoint corresponds to the GUM, generate and provide a GUM response corresponding to the GUM to the client device. The GUM response may include the requested GUM corresponding to the API. In one embodiment, the GUM response may include metadata such as, but not limited to, data, structure types, accessors, mutators, endpoints, and validation rules for the API.

In one embodiment, the GUM response may include information associated with automatically generating a user interface (UI) for create, read, update, and delete (CRUD) operations on data managed by a plurality of endpoints associated with the API. In another embodiment, the GUM response may include an identifier corresponding to one of a plurality of endpoints of the API and/or at least one of a plurality of validation rules associated with the API. In yet another embodiment, the GUM response may include textual labels associated with the API and/or help text associated with the API. Such textual labels and help text may be useful in generating the graphical portions of the UI, either by a developer or automatically.

Optionally, processing logic at block 311 may encode the GUM response according to a JavaScript Object Notation (JSON) format before providing the GUM response to the requesting client device. In various other embodiments, any other format (e.g., XML, etc.) may be used. Optionally, processing logic at block 312 may automatically (e.g., without human interaction) generate and provide the GUM response in response to receiving the request for the GUM (e.g., so long as the GUM exists at the endpoint to which the request was made). For example, GUM may be generated for the API in real-time (e.g., substantially real-time) when the GUM is requested. In one embodiment, each time the GUM is requested, the GUM is regenerated and provided. In another embodiment, the GUM may be cached for some defined amount of time after creation, and a cached version of the GUM may be provided upon request.

At block 320, processing logic may, in response to determining, by the processing device, that the well-known endpoint does not correspond to the GUM, provide an error message to the client device. In one embodiment, the error message may be a data message that indicates that no such GUM exists or that no such endpoint exists. In some embodiments, the error message may contain information identifying the GUM endpoint requested so that a client device may perform a second GUM request to the correct endpoint.

Figure 4:
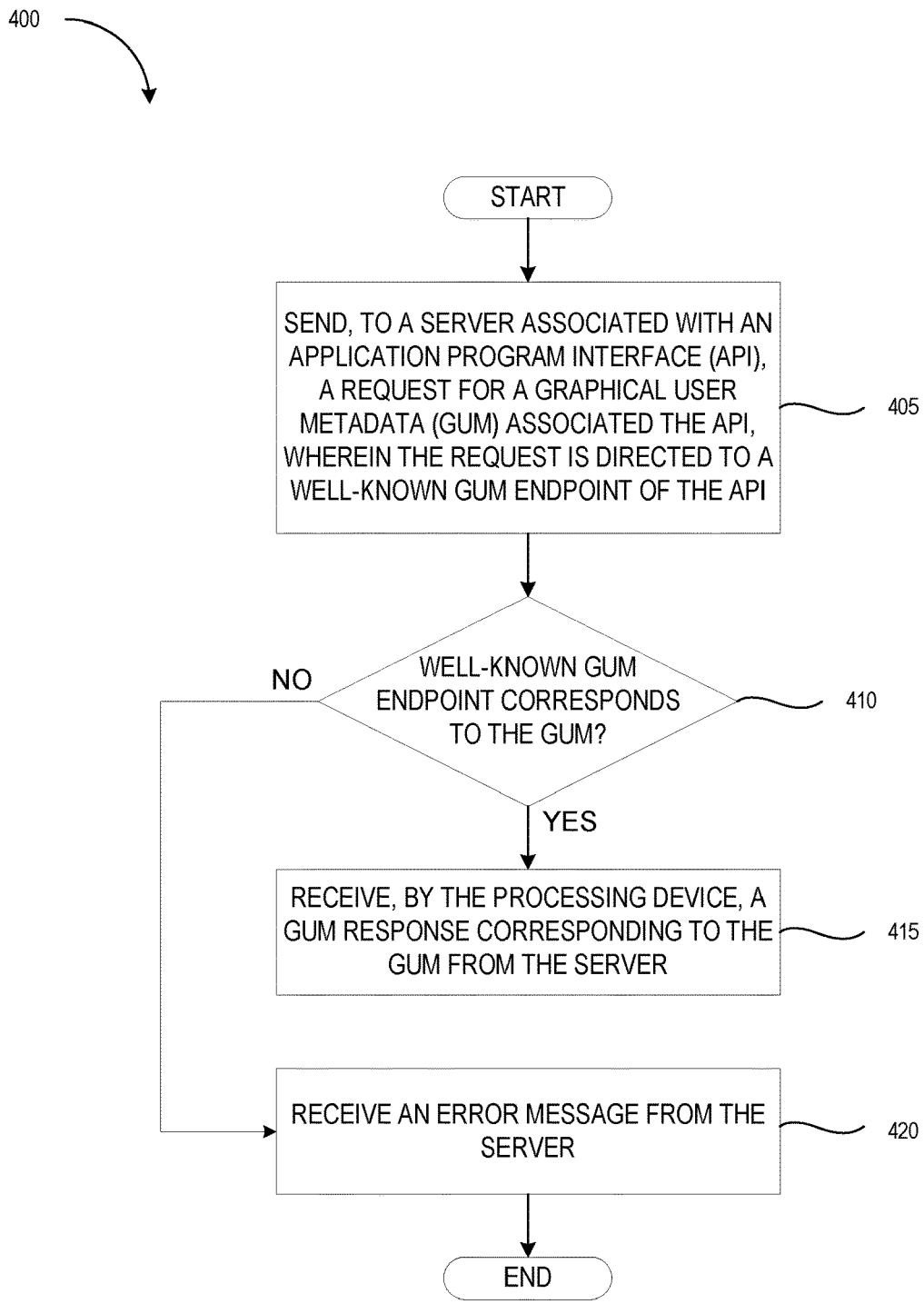
FIG. 4 is a flow diagram of a method of client-side user interface metadata from an application program interface, in accordance with some embodiments of the present disclosure.

FIG. 4 is a flow diagram 400 of a method of client-side user interface metadata from an application program interface, in accordance with some embodiments of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 4, at block 405, processing logic sends, to a server associated with an application program interface (API), a request for a graphical user metadata (GUM) associated the API, wherein the request is directed to a well-known GUM endpoint of the API In one embodiment, the API may be a REST API. In another embodiment, the API may be any type of API. In one embodiment, processing logic sends the request to a well-known GUM endpoint of the API. As discussed herein, in one embodiment, the GUM endpoint may be known by the client device without the client device requesting specific knowledge of the endpoint from the API.

At block 410, processing logic may determine whether the well-known GUM endpoint corresponds to the GUM that was requested. For example, processing logic may determine if the well-known GUM endpoint exists and is capable of receiving and serving GUM requests. In one embodiment, processing logic may perform various operations based on the determination. At block 415, processing logic may, in response to determining, by a processing device, that the well-known GUM endpoint corresponds to the GUM, receive, by the processing device, a GUM response corresponding to the GUM from the server. The GUM response may include the requested GUM corresponding to the API. In one embodiment, the GUM response may include metadata such as, but not limited to, data, structure types, accessors, mutators, endpoints, and validation rules for the API.

In one embodiment, the GUM response may include information associated with automatically generating a user interface (UI) for create, read, update, and delete (CRUD) operations on data managed by a plurality of endpoints associated with the API. In another embodiment, the GUM response may include an identifier corresponding to one of a plurality of endpoints of the API and/or at least one of a plurality of validation rules associated with the API. In yet another embodiment, the GUM response may include textual labels associated with the API and/or help text associated with the AP. Such textual labels and help text may be useful in generating the graphical portions of the UI, either by a developer or automatically.

At block 420, processing logic may, in response to determining, by the processing device, that the well-known endpoint does not correspond to the GUM, receive an error message from the server. In one embodiment, the error message may be a data message that indicates that no such GUM exists or that no such endpoint exists. In some embodiments, the error message may contain information identifying the GUM endpoint requested so that a client device may perform a second GUM request to the correct endpoint.

As described herein, in one embodiment, processing logic may automatically generate the UI in response to receiving the GUM response. In another embodiment, the information included in the GUM response may be used by a developer to generate the UI.

Figure 5:
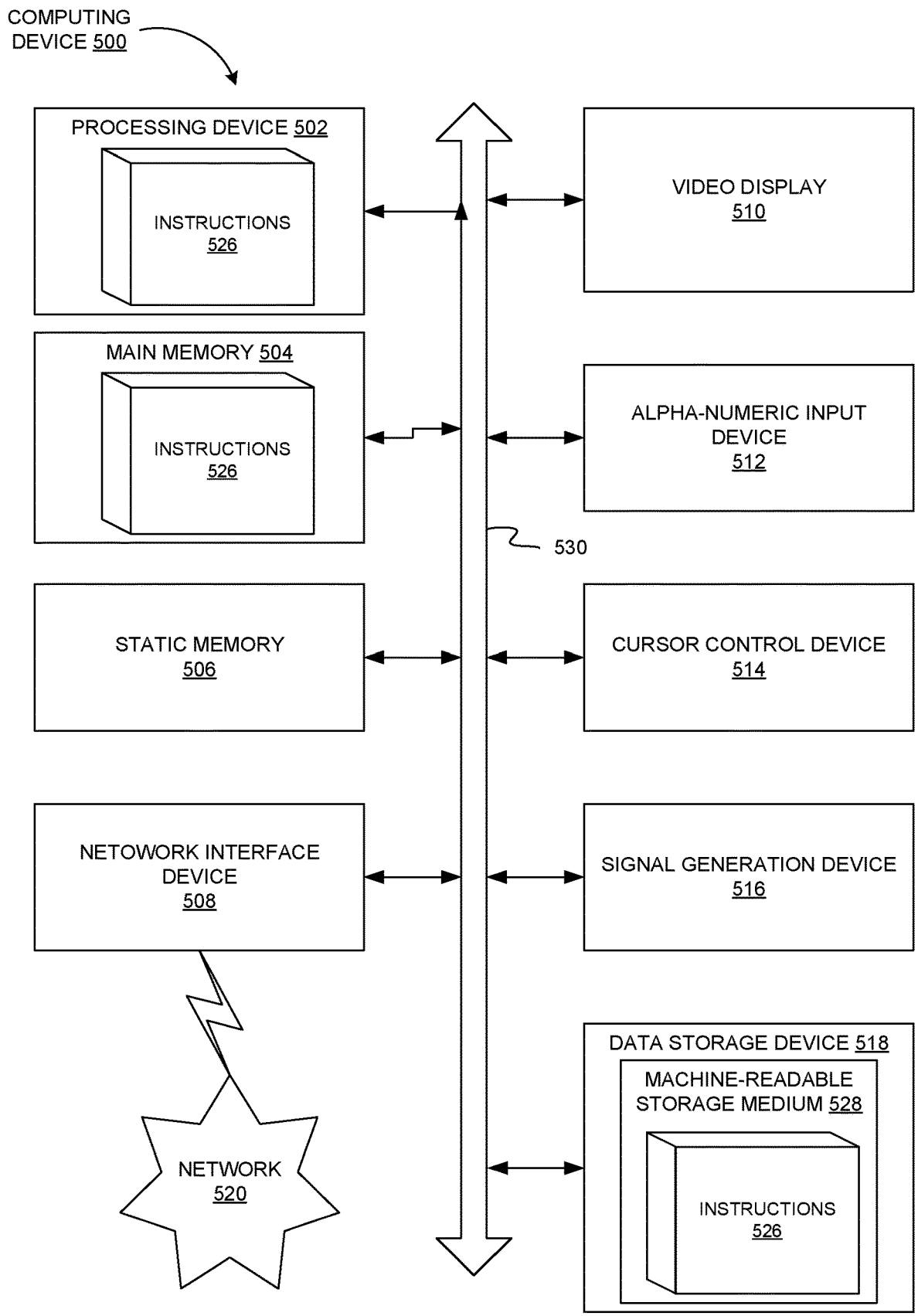
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein. In one embodiment, processing device 502 represents processing device 120 of FIG. 1. In another embodiment, processing device 502 represents a processing device of a client device (e.g., client device 150 of FIG. 1).

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. Instructions implementing module 526 may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 6:
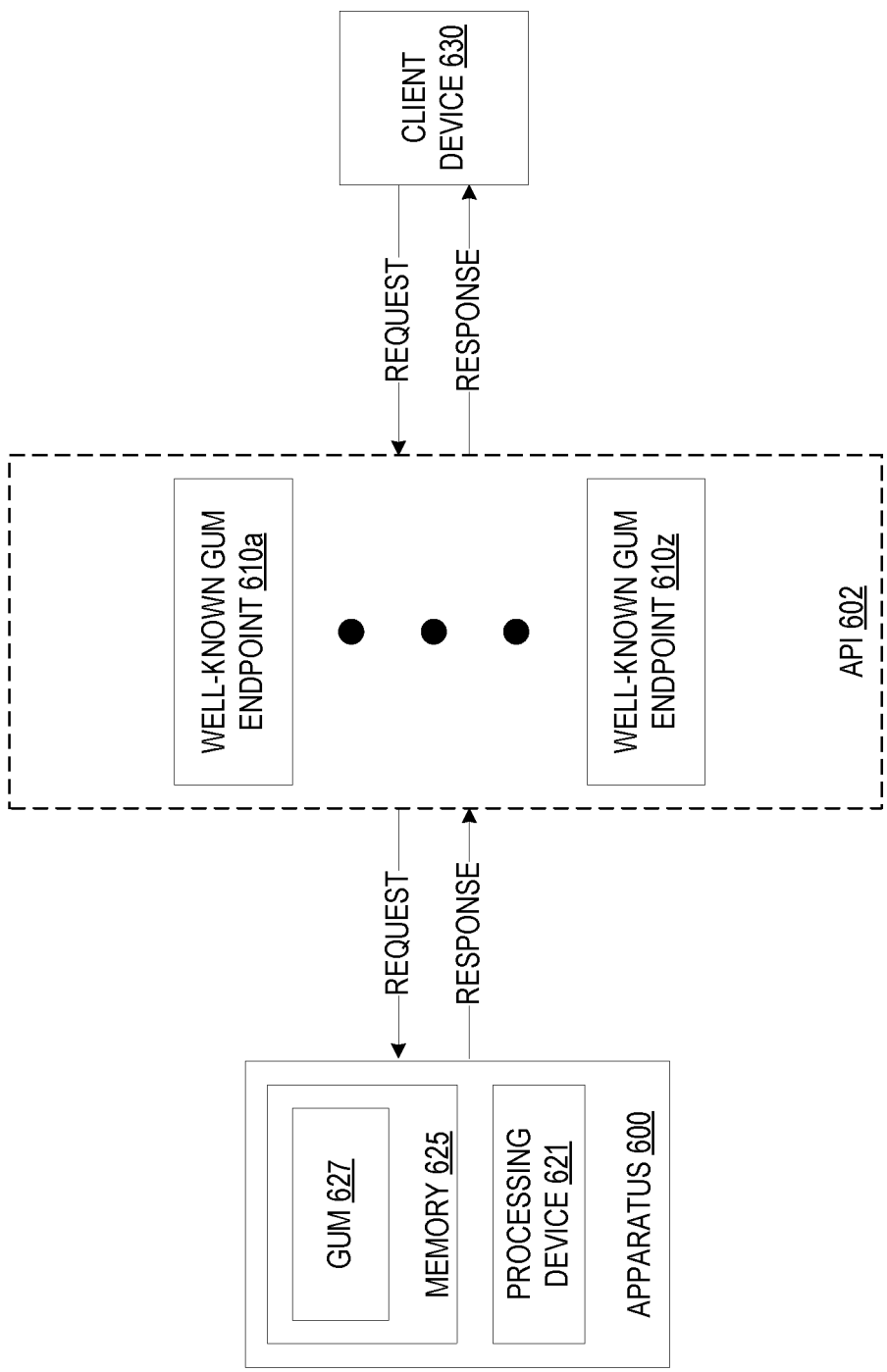
FIG. 6 is a block diagram of an example apparatus that may perform one or more of the operations described herein, in accordance with some embodiments.

FIG. 6 is a block diagram of an example apparatus 600 that may perform one or more of the operations described herein, in accordance with some embodiments. The apparatus 600 includes a memory 625 to store graphical user metadata (GUM) 627 associated with an application program interface (API) 602. The apparatus 600 also includes a processing device 621 operatively coupled to the memory. The processing device 621 may receive, from a client device 630, a request for the GUM associated with the API 602, wherein the request is directed to a well-known GUM endpoint of the API (e.g., any of endpoints 610a-z). Processing device 621 may, in response to a determination that the well-known GUM endpoint corresponds to the GUM, provide a GUM response corresponding to the GUM to the client device 630. Processing device 621 may, in response to a determination that the well-known endpoint does not correspond to the GUM, provide an error message to the client device 630.

Unless specifically stated otherwise, terms such as "receiving," "determining," "encoding," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:
1. A method, comprising:
receiving, from a client device, a request for graphical user metadata (GUM) to generate a graphical user interface (GUI) representing operations managed by an application program interface (API) associated with the GUM, wherein the request is directed to a well-known GUM endpoint of the API, wherein the API comprises at least one access endpoint to allow the client device to access functionality provided by the API, wherein the well-known GUM endpoint is separate from the at least one access endpoint of the API, and wherein the well-known GUM endpoint of the API is to provide information describing the operations managed by the at least one access endpoint of the API;

determining whether the requested GUM is located at the well-known GUM endpoint of the API; and in response to determining, by a processing device, that the requested GUM is located at the well-known GUM endpoint:

generating, by the processing device, a GUM response comprising a plurality of validation rules associated with the operations managed by the at least one access endpoint of the API to construct the GUI in view of the GUM response, wherein the GUI comprises graphical and functional components for accessing the operations managed by the at least one access endpoint of the API and for performing the operations managed by the at least one access endpoint; and providing the GUM response comprising the plurality of validation rules to the client device to generate the GUI for the accessing the at least one access endpoint and the performing the operations managed by the at least one access endpoint.

2. The method of claim 1, further comprising encoding the GUM response according to a JavaScript Object Notation (JSON) format.

3. The method of claim 1, wherein the API is a representational state transfer (REST) API.

4. The method of claim 1, further comprising: automatically generating and providing the GUM response in response to receiving the request for the GUM.

5. The method of claim 1, wherein the operations managed by the at least one access endpoint comprise creating, reading, updating and deleting (CRUD) operations.

6. The method of claim 5, wherein of the GUM response further comprises one or more of structure types, accessors, or mutators associated with the API.

7. The method of claim 6, wherein the GUM response further comprises at least one of: textual labels associated with the API or help text associated with the API.

8. An apparatus, comprising:

a memory to store graphical user metadata (GUM) to generate a graphical user interface (GUI) representing operations managed by an application program interface (API) associated with the GUM; and a processing device operatively coupled to the memory, the processing device to:

receive, from a client device, a request for the GUM associated with the API, wherein the request is directed to a well-known GUM endpoint of the API, wherein the API comprises at least one access endpoint to allow the client device to access functionality provided by the API, wherein the well-known GUM endpoint is separate from the at least one access endpoint of the API, and wherein the well-known GUM endpoint of the API is to provide information describing the operations managed by the at least one access endpoint of the API;

determine whether the requested GUM is located at the well-known GUM endpoint of the API; and in response to a determination that the requested GUM is located at the well-known GUM endpoint, the processing device further to:

generate, from the GUM located at the well-known GUM endpoint, a GUM response comprising a plurality of validation rules associated with the operations managed by the at least one access endpoint of the API to construct the GUI, wherein the GUI comprises graphical and functional components to access the operations managed by the at least one access endpoint of the API and to perform the operations managed by the at least one access endpoint; and provide the GUM response comprising the plurality of validation rules to the client device to generate the GUI to access the at least one access endpoint and to perform the operations managed by the at least one access endpoint.

9. The apparatus of claim 8, wherein the GUM response is encoded according to a JavaScript Object Notation (JSON) format.

10. The apparatus of claim 8, wherein the API is a representational state transfer (REST) API.

11. The apparatus of claim 8, wherein the processing device is further to automatically generate and provide the GUM response in response to receiving the request for the GUM.

12. The apparatus of claim 8, wherein the operations managed by the at least one access endpoint comprise create, read, update, and delete (CRUD) operations.

13. The apparatus of claim 12, wherein of the GUM response further comprises one or more of structure types, accessors, or mutators associated with the API.

14. The apparatus of claim 13, wherein of the GUM response further comprises at least one of: textual labels associated with the API or help text associated with the API.

15. A non-transitory computer-readable storage medium including instructions that, when executed by a processing device, cause the processing device to:

receive, at a server associated with an application program interface (API), a request for graphical user metadata (GUM) to generate a graphical user interface (GUI) representing operations managed by the API, wherein the request is directed to a well-known GUM endpoint of the API, wherein the API comprises at least one access endpoint to allow access to functionality provided by the API, wherein the well-known GUM endpoint is separate from the at least one access endpoint of the API, and wherein the well-known GUM endpoint of the API is to provide information describing the operations managed by the at least one access endpoint of the API;

determine whether the requested GUM is located at the well-known GUM endpoint of the API; and in response to a determination that the requested GUM is located at the well-known GUM endpoint, the processing device further to:

generate, from the GUM located at the well-known GUM endpoint, a GUM response comprising a plurality of validation rules associated with the operations managed by the at least one access endpoint of the API to construct the GUI, wherein the GUI comprises graphical and functional components to access the operations managed by the at least one access endpoint of the API and to perform the operations managed by the at least one access endpoint; and provide, by the processing device, the GUM response comprising the plurality of validation rules corresponding to the GUM to generate the GUI to access the at least one access endpoint and to perform the operations managed by the at least one access endpoint.

16. The non-transitory computer-readable storage medium of claim 15, wherein the API is a representational state transfer (REST) API.

17. The non-transitory computer-readable storage medium of claim 16, wherein the operations managed by the at least one access endpoint comprise create, read, update, and delete (CRUD) operations.

18. The non-transitory computer-readable storage medium of claim 17, wherein the processing device is further to automatically generate the GUM response in response to receiving the request for the GUM.

19. The non-transitory computer-readable storage medium of claim 17, wherein the GUM response further comprises one or more of structure types, accessors, or mutators associated with the API.

20. The non-transitory computer-readable storage medium of claim 19, wherein of the GUM response further comprises at least one of: textual labels associated with the API or help text associated with the API.

* * * * *